United States Patent [19]
Pfost et al.

[11] Patent Number: 5,552,580
[45] Date of Patent: Sep. 3, 1996

[54] HEATED COVER DEVICE

[75] Inventors: Robert F. Pfost, Los Altos; Nebojsa Avdalovic, Cupertino, both of Calif.

[73] Assignee: Beckman Instruments, Inc., Fullerton, Calif.

[21] Appl. No.: 798,020

[22] Filed: Nov. 20, 1991

Related U.S. Application Data

[63] Continuation of Ser. No. 455,694, Dec. 22, 1989, abandoned.

[51] Int. Cl.$^6$ ........................................ H05B 3/04
[52] U.S. Cl. ........................ 219/521; 219/524; 392/389
[58] Field of Search ........................... 219/521, 407, 219/438, 431, 429, 432, 433, 436, 524, 525, 243, 438; 392/388, 389, 309, 403

[56] References Cited

U.S. PATENT DOCUMENTS

| | | | |
|---|---|---|---|
| 1,091,714 | 3/1914 | Stanley | 219/521 |
| 1,774,996 | 9/1930 | Rohrmann | 392/309 |
| 1,814,754 | 7/1931 | James | 219/433 |
| 2,700,724 | 1/1955 | Lynch | 219/435 |
| 2,793,609 | 5/1957 | Shen | 219/271 |
| 3,152,240 | 10/1964 | Scott | 219/275 |
| 3,218,434 | 11/1965 | Lee | 219/385 |
| 3,271,562 | 9/1966 | Roberts | 219/275 |
| 3,725,010 | 4/1973 | Penhasi | 23/253 |
| 3,796,977 | 3/1974 | Elliott | 219/209 |
| 3,877,444 | 4/1975 | Senga et al. | 123/75 |
| 3,900,305 | 8/1975 | DeLuca | 65/30 |
| 3,907,607 | 9/1975 | Chu et al. | 148/1.5 |
| 3,934,587 | 1/1976 | Gordon | 128/284 |
| 3,981,163 | 9/1976 | Tillotson | 68/5 |
| 4,049,936 | 9/1977 | Frink et al. | 200/146 |
| 4,056,824 | 11/1977 | Iiyama et al. | 354/300 |
| 4,114,003 | 9/1978 | Frink et al. | 200/144 |
| 4,145,893 | 3/1979 | Vogel | 62/151 |
| 4,183,151 | 1/1980 | Frezza | 34/155 |
| 4,246,835 | 1/1981 | Knutrud | 99/472 |
| 4,271,688 | 6/1981 | Tillotson | 68/5 |
| 4,295,822 | 10/1981 | Campbell | 432/29 |
| 4,316,447 | 2/1982 | Foreman | 126/369 |
| 4,335,697 | 6/1982 | McLean | 123/527 |
| 4,364,797 | 12/1982 | Beck et al. | 202/181 |
| 4,452,090 | 6/1984 | Kou et al. | 73/861 |
| 4,482,616 | 11/1984 | Connolly et al. | 429/101 |
| 4,495,149 | 1/1985 | Iwata et al. | 422/65 |
| 4,520,083 | 5/1985 | Prater et al. | 429/101 |
| 4,543,467 | 9/1985 | Eisele | 219/276 |
| 4,558,929 | 12/1985 | Stephens | 350/588 |
| 4,585,522 | 4/1986 | Beck et al. | 202/181 |
| 4,619,053 | 10/1986 | Schumacher | 34/12 |
| 4,622,446 | 11/1986 | Sugisawa | 34/1 |
| 4,654,980 | 4/1987 | Bhat | 34/12 |
| 5,019,348 | 5/1991 | Ohms et al. | 422/63 |
| 5,102,623 | 4/1992 | Yamamoto et al. | |

FOREIGN PATENT DOCUMENTS

| | | |
|---|---|---|
| 0311440 | 4/1989 | European Pat. Off. . |
| 0329862 | 8/1989 | European Pat. Off. . |
| 0377110 | 7/1990 | European Pat. Off. . |
| 0400965 | 12/1990 | European Pat. Off. . |
| 3815528 | 8/1989 | Germany . |
| WO86/01232 | 2/1986 | WIPO . |

OTHER PUBLICATIONS

News of Biomechanical Instrumentation (1972–No. 2) published by Spinco Division of Beckman Instruments, Inc.

Zimmermann, J. et al.; "Automated Sanger Dideoxy Sequencing Reaction Protocol"; *Federation of European Biochemical Societies* (Jun. 1988) vol. 233, No. 2, pp. 432–436.

Wilson, R. K., et al.; "Automation of Dideoxynu–cleotide DNA Sequencing Reactions Using a Robotic Workstation"; *BioTechniques* (Sep. 1988) vol. 6, No. 8, pp. 776–787.

*Primary Examiner*—Teresa J. Walberg
*Assistant Examiner*—Gregory L. Mills
*Attorney, Agent, or Firm*—William H. May; Janis C. Henry

[57] ABSTRACT

A heated cover for a receptacle containing a vaporizable substance. The cover is heated to a temperature above the temperature of the substance so as to prevent condensation of vapor evaporated from the substance. A device for placing and removing the cover with respect to the receptacle is designed in connection with a temperature-controlled heating/cooling plate which controls the temperature of the contents of the receptacle.

37 Claims, 3 Drawing Sheets

HEATED COVER DEVICE

This is a continuation of application Ser. No. 07/455,694, filed Dec. 22, 1989, abandoned.

BACKGROUND OF THE INVENTION

1. Field of the Invention

The present invention relates to covers for receptacles and more particularly to a heated cover which reduces evaporative loss of a material held in a receptacle and a device for placing and removing the cover on the receptacle.

2. Description of Related Art

Some materials, in liquid or solid form, will gradually evaporate even at a relatively low temperature such as room temperature. The rate of evaporation is dependent in part on the volatility of the material, the temperature of the material and the environment to which the material is exposed. Unless evaporation is purposely intended, evaporation of material is generally undesirable since the evaporation process involves a loss of material and a change in the concentration of the material remaining in the container.

Evaporation from an open container can be reduced to some extent by covering the opening of the container. However, in situations when a small amount of material is left in a container for a prolonged period of time, for example, repeated heating during DNA sequencing reactions, the rate of evaporation is too rapid for the small amount of sample available even with the container covered. Furthermore, the evaporated material tends to condense and adhere onto the cool underside of a cover. Thus, the volume of material in the container is being reduced both by evaporation and condensation because the condensate which adheres to the cover will be removed from the container when the cover is lifted away. Moreover, for a mixture of different types of materials, the overall concentration of the mixture components remaining in the container will change as a result of evaporation. It is important in some situations to maintain a constant concentration, such as in DNA sequencing reaction processes.

SUMMARY OF THE INVENTION

The present invention is directed to a device and a method for reducing the evaporative loss of a material which is held in a receptacle. The device comprises a cover which is being "heated" (temperature controlled) to a temperature above that of the solution to establish a temperature gradient across the space between the cover and the solution. The heated cover prevents condensation on the underside of the cover and thus reduces evaporative loss of the material.

In another aspect of the present invention, the device further comprises a mechanism which automatically places on and removes the cover from the receptacle. The device may also include a temperature controlled heating/cooling plate for controlling the temperature of the receptacle and its contents while it is covered by the heated cover. As an example, application of the present invention to DNA sequencing analysis will be discussed.

DESCRIPTION OF THE ILLUSTRATED EMBODIMENTS

The following description is of the best presently contemplated mode of carrying out the invention. This description is made for the purpose of illustrating the general principles of the invention and should not be taken in a limiting sense. The scope of the invention is best determined by reference to the appended claims.

The present invention will be described with reference to applications in the area of DNA research. It will be appreciated that the present invention can be applied to other areas, for scientific purposes or otherwise, in situations where evaporative loss of a material, in solid or liquid form, held in a container is to be minimized.

Figure 1:
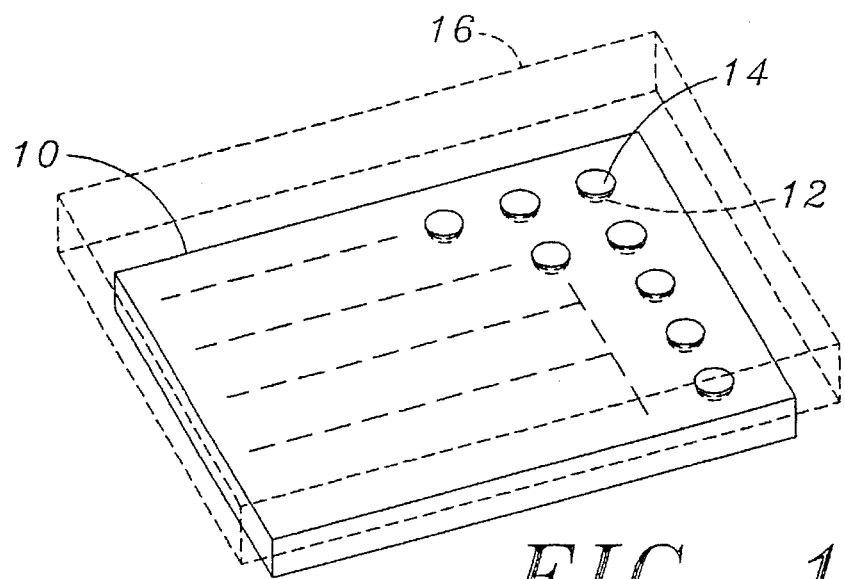
FIG. 1 is a perspective view of a multi-well receptacle covered with a heated cover in accordance with one embodiment of the present invention.

In DNA research, biological and chemical assays often require holding the specimen in receptacles for a prolonged period of time. Referring to FIG. 1, a multiwell receptacle 10 is shown which is used to hold DNA reagents, such as DNA polymerase and DNA templates in a solution 12 in the wells 14. As will be explained in greater detail below, the receptacle 10 may be adapted to be incorporated in an automated laboratory workstation such as the BIOMEK® 1000 developed by Beckman Instruments, Inc. which performs a sequence of functions automatically to the solution 12 without intervention by an operator.

For some analyses, it is necessary to warm the receptacle 10 to a controlled temperature to accelerate chemical reaction of the DNA material. At the elevated temperature, the solution 12 tends to evaporate at a higher rate. To reduce evaporation and consequent loss of material from the receptacle 10, it is covered with a cover 16 (indicated by dotted outlines) which is heated to above the temperature of the solution 12 contained in the receptacle 10. It has been found that the desired effect can be achieved by maintaining the temperature of the cover 16 at a temperature 5° C. higher than the temperature of the solution 12. The space below the cover 16 experiences a gradual temperature gradient from the warmer cover 16 to the cooler solution 12.

Figure 2:
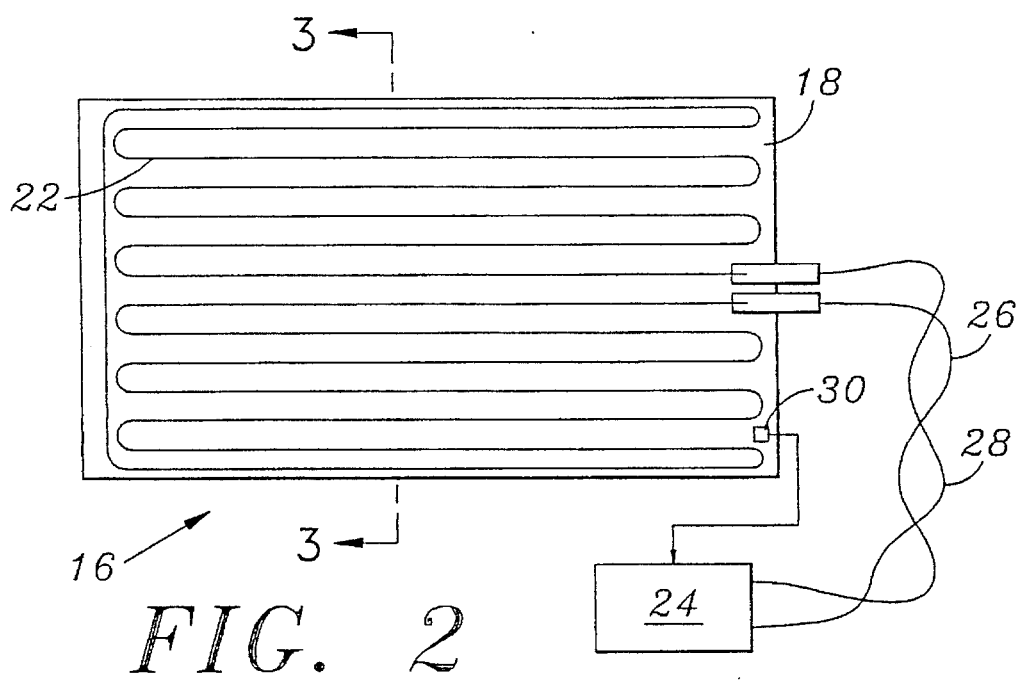
FIG. 2 is a top view of a heated cover according to one embodiment of the present invention.
Figure 3:
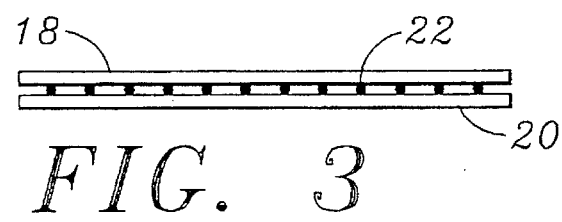
FIG. 3 is a section view taken along line 3—3 of the heated cover in FIG. 2.

The detail structure of the cover 16 is shown in FIGS. 2 and 3. The cover 16 is sized to cover the entire top area of the receptacle 10. Referring to FIG. 3, the cover 16 has two thin plates 18 and 20 made of rigid, heat tolerant material. It has been found that ceramics, glass, or silicon rubber, for example, are acceptable materials for the plate 20.

Sandwiched between the plates 18 and 20 is an electrical resistive heating element 22 which may be in the form of a small diameter Nichrome wire or formed by depositing resistive materials such as Nichrome or stannous oxide on one of the plates. As an example, a 36 gauge Nichrome wire with a resistivity of 12 Ohms per foot may be used to provide sufficient heating to the cover 16. The heating element 22 is configured in a serpentine fashion across the area of the plates 18 and 20 so as to provide uniform heating across the cover 16. A filler material such as epoxy may be used to secure the plates and to fill the voids between the plates 18 and 20. The epoxy retains and distributes the heat within the cover 16.

The heating element 22 is connected to a variable power supply 24 which can be controlled to provide current for heating the cover 16 to a desired temperature. The leads 26 and 28 between the power supply 24 and the heating element 22 may be flexible and configured to avoid stress in the leads 26 and 28 so that the cover 16 can be moved without restriction, e.g. by a robotic means in an automated laboratory workstation. A temperature sensor 30 may be provided on the cover 16 to measure its temperature and provide feedback for controlling the power supply 24 for obtaining a desired temperature.

It is emphasized that the "heating" of the cover 16 described above is in reference to the of the temperature volatile substance. In the examples described throughout the disclosure herein, the temperature of the substance in the receptacle is at or above ambient temperature. It is contemplated that for situations in which the temperature of the substance is below ambient temperature, it may be desirable to cool the cover to a temperature below ambient but above the temperature of the substance vapor. This is to maintain minimum temperature differential between the cover and the substance so that the temperature of the cover would not affect the controlled temperature of the substance in the receptacle.

Frequently, in laboratory experiments involving biochemical compounds such as DNA, it is necessary to maintain a temperature for a period of time that will retard or accelerate or in some way enhance a reaction. Temperature is used to control rates of biochemical reactions, in this particular case the enzymatic extension of long chain molecules such as DNA. Sometimes higher temperatures are used to dissociate the double stranded chain of the DNA molecules. Cooling is used to reassociate the separated chains with complimentary primer DNA molecules. In these examples, timing of the application of the heating or cooling of the chemical compositions can play a paramount role in the results and extensive evaporative loss of the chemical compositions can affect the results of the experiments. The present invention provides an attachment for use on an automated laboratory workstation to control the temperature of the chemical compositions while reducing evaporative loss.

Figure 4:
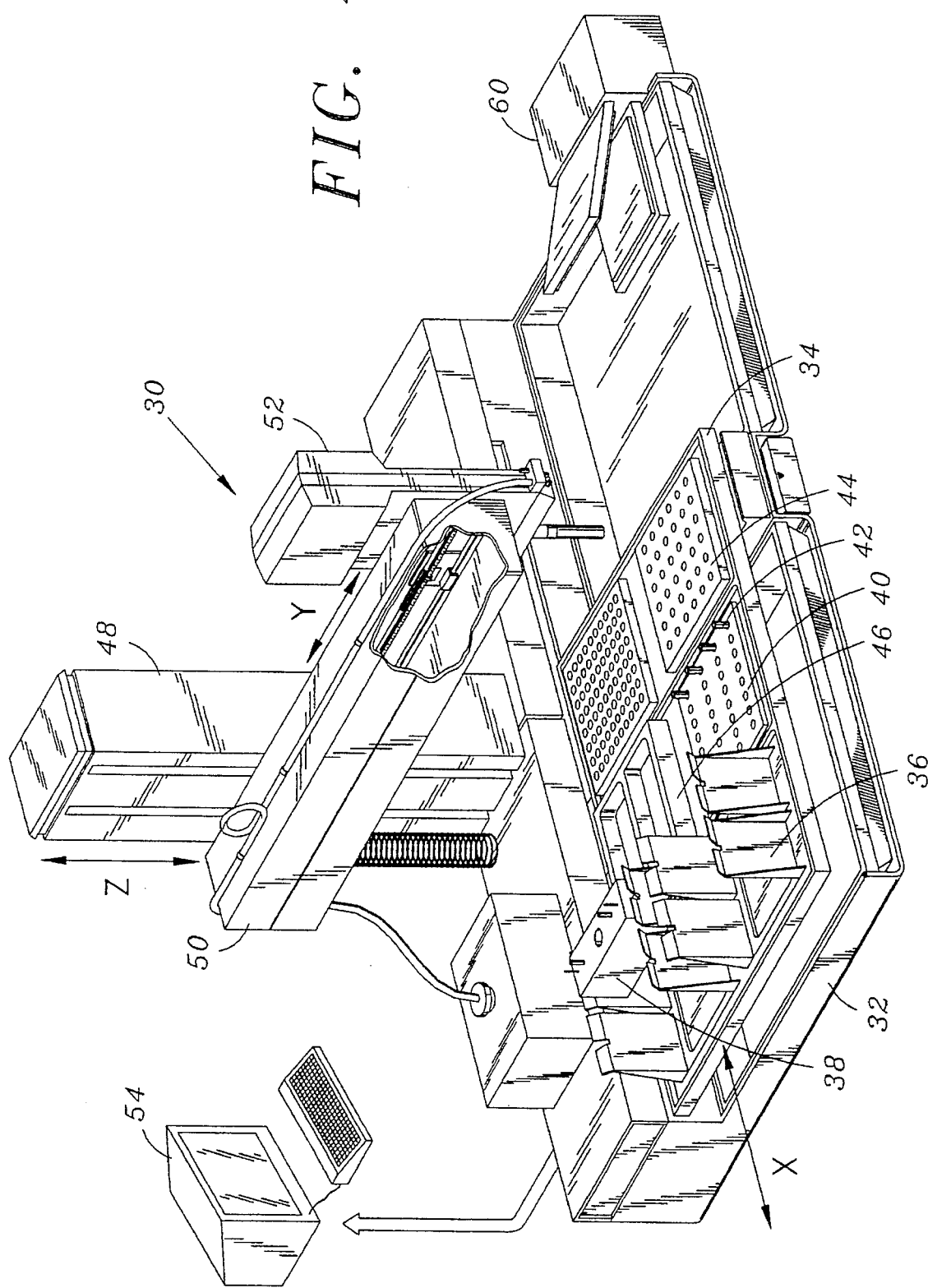
FIG. 4 is a perspective view of an automated laboratory workstation which incorporates a cover attachment for placing and removing the heated cover with respect to a receptacle on the workstation.

A mechanical means of automatically placing and removing the heated cover on and from the receptacle 10 has been developed in connection-with the Beckman BIOMEK® 1000 automated laboratory workstation. Referring to FIG. 4, a perspective view of an automated laboratory workstation 30 similar to the BIOMEK® 1000 is shown. This workstation has been described in detail in copending U.S. patent application Ser. No. 07/383,299 also assigned to the assignee of the present invention. For purposes of discussion of the present invention herein, only the relevant components of the automated laboratory workstation 30 shown in FIG. 4 will be described.

The workstation 30 comprises a base 32 on which a tablet 34 is moved horizontally (arrow X) by stepping motors (not shown). The tablet 34 supports a number of tool stands 36 for holding various tools, for example multiple-port pipette 38; a tray 40 for holding for example pipette tips 42; multi-well titer plates 44; a reservoir 46 for holding solutions; and other labwares required for carrying out a sequence of laboratory operations. A tower 48 vertically extends from the base 32. A horizontally supported arm 50 can be moved vertically (arrow Z) along the tower 48. A robot hand 52 is supported at the end of the arm 50. The robot hand 52 is designed to pick up and manipulate the tools 38. The robot hand 52 is movable horizontally along the arm 50 in a transverse direction (arrow Y) with respect to the tablet 34 horizontal movement (arrow X). It can be seen that through the combined vertical (Z), horizontal (X) and transverse (Y) motions of the arm 50, tablet 34 and robot hand 52, respectively, a series of laboratory steps can be sequentially performed, for example pipetting a desired quantity of reagent from reservoir 46 into the multi-well titer plate 44. The movements of the various robotic components are actuated by stepper motors and lead screws controlled by a minicomputer 54.

Figure 5:
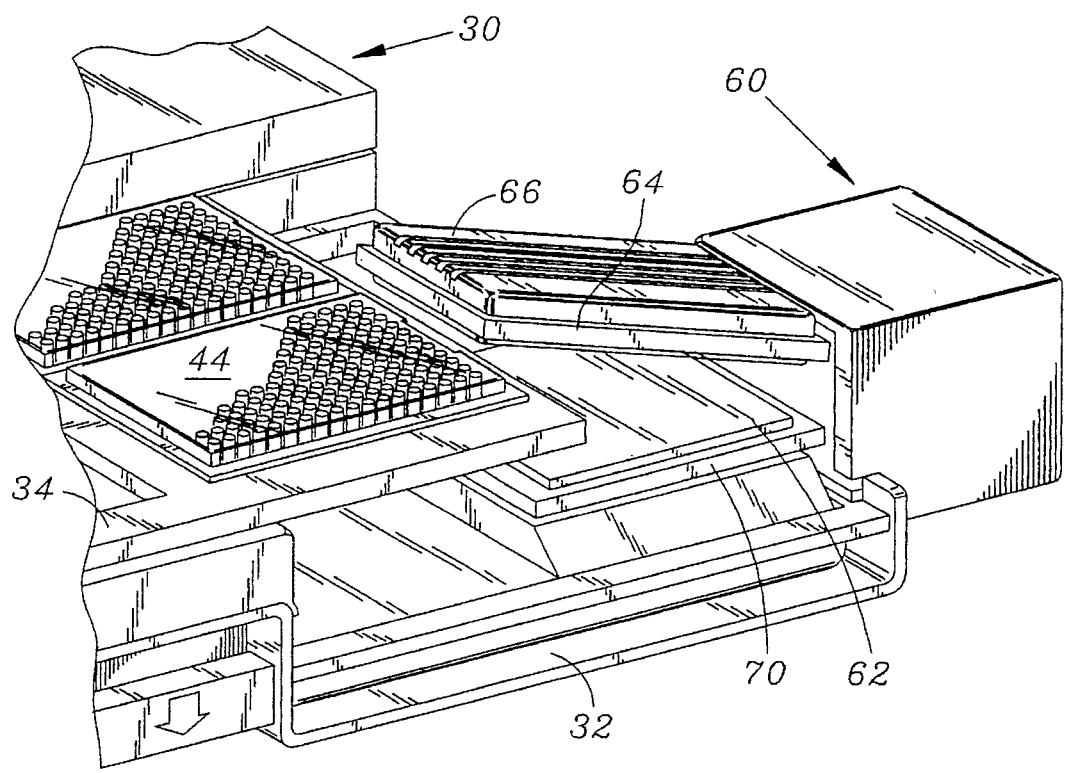
FIG. 5 is a perspective view of the cover attachment in accordance with one embodiment of the present invention.
Figure 6:
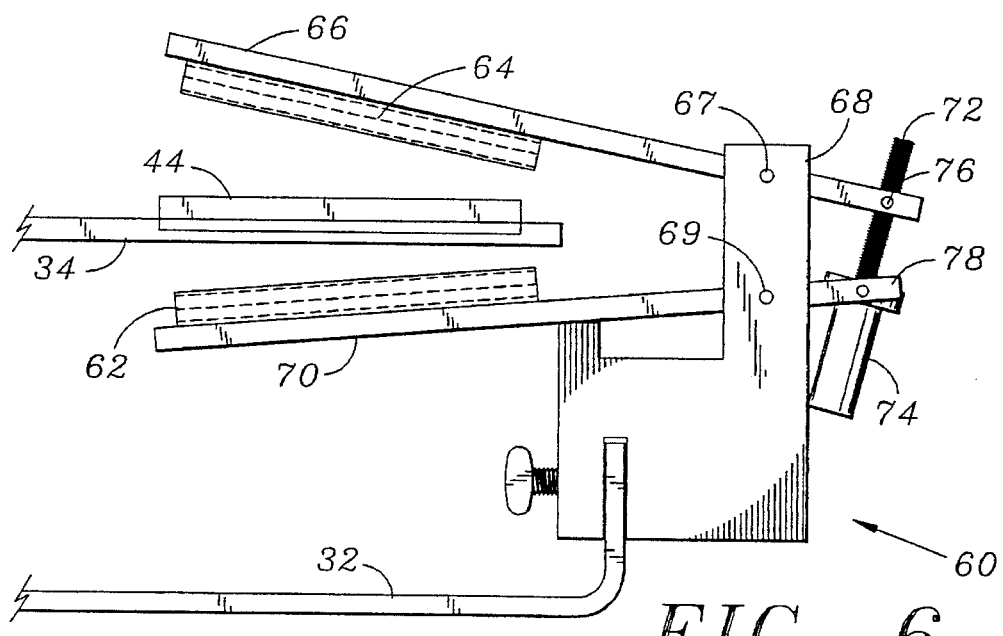
FIG. 6 is a simplified sectional view of the cover attachment of FIG. 5.

The heated cover described above may be incorporated into the workstation 30 by an attachment 60 which is more clearly shown in FIGS. 5 and 6. This attachment 60 will be referred to as a contact incubator. The term "contact" is derived from the fact that the plate 62 of the device 60 actually come into intimate contact with the multi-well titer plate 44 that is to be incubated. The incubator 60 comprises a temperature controlled plate 62 which may be heated or cooled and a heated cover 64. As will be appreciated following the description of the incubator 60 below, by incorporating the temperature-controlled plate 62 and cover 64 into the automated workstation 30, the heating and cooling requirements of a laboratory procedure such as incubation of DNA specimens can be programmed into the control 54 for the automated workstation 30 to allow the procedure to be carried out without further operator intervention.

The cover 64 may have a structure similar to that described with respect to FIGS. 2 and 3. Cover 64 may be formed from resilient material to provide a seal with the upper surface of the titer plate 44 plate 44 thereby sealing individual wells 14. The cover 64 is supported by an upper jaw 66 which is pivoted to the frame 68 at pivot 67. The temperature-controlled plate 62 is supported on a lower jaw 70 which is pivoted to the frame 68 at pivot 69. A lead screw 72 driven by a motor 74 couples the ends 76 and 78 of the jaws 66 and 70 on the other side of the pivots 67 and 69. The ends 76 and 78 of the jaws may be drawn towards one another or moved apart by rotation of the lead screw 72. Such motion causes the jaws 66 and 70 to open or close, respectively.

The incubator 60 is attached to the base 32 of the workstation 30. Thus, by moving the tablet 34 to position the multi-well titer plate 44 in between the jaws 66 and 70, the cover 64 and temperature controlled plate 62 can be "clamped" on the multi-well titer plate 44. At the clamped configuration, the temperature controlled plate 62 is pressed against the bottom of the multi-well titer plate 44 and the cover 64 is pressed over the titer plate 44. The plate 62 therefore controls the temperature of the contents of the multi-well plate 44 and the cover 64 reduces evaporation of the contents. It has been found that a cover temperature of 5° C. above the temperature of the plate 62 is sufficient to reduce evaporation.

The temperature controlled plate 62 may be made of resilient material and heated or cooled by embedded Peltier elements, resistance wires, or temperature controlled fluid circulated within the plate. The temperature control plate 62 can be preheated prior to clamping on the multi-well titer plate 44. This will enable a rapid temperature rise to be imparted to the multi-well plate 44 once the plate 62 comes into contact with the multi-well titer plate 44. Thereafter, the plate 62 is allowed to cool slowly by controlling the heating current. Other desired heating and cooling profiles may be programmed by suitable microprocessor control of the power supplied to the temperature control plate 62 and to the cover 64. It has also been found that more rapid heating or cooling can be accomplished by incorporating graphite particles or metal particles in the resilient material of the temperature controlled plate 62.

The top surface of the temperature controlled plate 62 may be provided with wells which conform to the shape of the underside of the multi-well titer plate 44. This enables the plate 62 to come into close contact with the multi-well titer plate 44 for efficient temperature transfer.

It is to be understood that in situations where the temperature of the multi-well titer plate 44 is not to be controlled, only the temperature of the cover 64 is controlled to reduce evaporative loss and the plate 62 is either not clamped against the underside of the multi-well plate 44 or is not activated.

It can be seen that by integrating a temperature-controlled plate 62 and cover 64 in the automated workstation 30, the temperature of the contents of the multi-well titer plate can be accurately controlled and the evaporative loss of the contents can be reduced. A sequence of laboratory functions can be performed automatically without operator intervention. For example, the sequence may include dispensing an initial amount of biochemical specimen into the microwell titer plate 44, moving the tablet 34 to position the micro-well titer plate 44 in between the jaws 66 and 70 of the incubator 30, clamping the multi-well titer plate 44 to begin a temperature-controlled incubation cycle, withdrawing the multi-well titer plate 44 from the incubator 60 for addition of specimens or reagents, further incubation, and other desired laboratory procedures to be performed to the contents of the multi-well titer plate 44.

While the invention has been described with respect to the illustrated embodiments in accordance therewith, it will be apparent to those skilled in the art that various modifications and improvements may be made without departing from the scope and spirit of the invention. It will be appreciated that the size and shape of the heated cover may be selected depending on the size and shape of the receptacle. Instead of sandwiching the heating element between two plates, the heating element may be disposed on one side of a plate or embedded within a slab. Other means of heating the cover plate may be utilized. The clamping mechanism may be incorporated in other types of workstations or used as a stand-alone contact incubator. The clamping mechanism may be caused to move by the workstation to approach a stationary receptacle. The jaws of the clamping mechanism may be independently actuated using separate controls. Accordingly, it is to be understood that the invention is not to be limited by the specific illustrated embodiments, but only by the scope of the appended claims.

We claim:

1. A device for covering a receptacle containing a vaporizable substance subject to temperature control, the device comprising:

a frame;

a base supported on the frame, the base is configured to be positioned against the receptacle and having means for effecting temperature control of the substance; and a cover supported on the frame, the cover is configured to be placed over the receptacle for reducing evaporative loss, the cover and the base are pivoted on the frame in opposing positions such that the receptacle can be positioned between the cover and the base, and the base and cover can be pivotally positioned against the bottom and top, respectively, of the receptacle.

2. A device as in claim 1 further comprising means for controlling temperature of the cover.

3. A device as in claim 2 wherein the means for controlling temperature of the cover controls the temperature of the cover to above the temperature of the substance in the receptacle.

4. A device as in claim 3 wherein the means for controlling temperature of the cover maintains the temperature of the cover 5° C. above the temperature of the substance.

5. For covering a receptacle containing a vaporizable substance, a device comprising a frame;

a cover pivotally supported on the frame to allow placement of the cover on the receptacle; and a temperature controlled base pivotally supported on the frame so that the base can be pivoted to position the base against the bottom of the receptacle.

6. A device as in claim 5, further comprising means for controlling the temperature of the cover.

7. A device as in claim 6 wherein the frame is configured for attachment to an automated laboratory workstation which manipulates the receptacle in cooperative function with the device.

8. A laboratory device for processing a biological or chemical sample substance comprising:

a receptacle for containing a small volume of vaporizable biological or chemical substance for laboratory processing;

a cover configured to cover the receptacle for substantially preventing escape of vapor from the receptacle;

temperature means for varying the temperature of the cover; and control means for actively controlling the temperature means to maintain the temperature of the cover to above the temperature of the substance in the receptacle, wherein the control means includes feedback means for feeding back the actual temperature of the cover, 9. A device as in claim 8 wherein the control means controls the temperature means to maintain the temperature of the cover to be slightly above the temperature of the substance in the receptacle.

10. A device as in claim 8 further comprising positioning means for positioning the cover onto the receptacle.

11. A device as in claim 10 wherein the positioning means includes means for providing automatic control to control the positioning of the cover onto the receptacle.

12. A device as in claim 11 wherein the positioning means further includes means for pivoting the cover onto the receptacle.

13. A device as in claim 8 further comprising substance temperature means for effecting temperature control of the substance in the receptacle.

14. A device as in claim 13 further comprising means for positioning the receptacle relative to the substance temperature means for cooperative engagement therewith.

15. A device as in claim 13 wherein the substance temperature means controls the temperature of the substance in accordance with a specified temperature profile.

16. A device as in claim 15 wherein the control means controls the temperature means to maintain the temperature of the cover to be slightly above the temperature of the substance in the receptacle.

17. A device as in claim 15 wherein the control means controls the temperature means to maintain the temperature of the cover to be at a substantially fixed given temperature above the temperature of the substance in the receptacle.

18. A device as in claim 17 wherein the control means controls the temperature means to maintain the temperature of the cover to be substantially 5° C. above the temperature of the substance in the receptacle.

19. A device as in claim 8 wherein the receptacle comprises multiple sample wells.

20. A laboratory device for processing a biological or chemical sample substance comprising:

a receptacle for containing a small volume of vaporizable biological or chemical substance for laboratory processing;

a cover configured to cover the receptacle for substantially preventing escape of vapor from the receptacle;

temperature means for varying the temperature of the cover; and control means for actively controlling the temperature means to maintain the temperature of the cover to above the temperature of the substance in the receptacle, wherein the control means actively controls the temperature means to maintain the temperature of the cover in accordance with a specified temperature profile.

21. A laboratory device for processing a biological or chemical sample substance comprising:

a receptacle for containing a small volume of vaporizable biological or chemical substance for laboratory processing;

a cover configured to cover the receptacle for substantially preventing escape of vapor from the receptacle;

temperature means for varying the temperature of the cover; and control means for actively controlling the temperature means to maintain the temperature of the cover to above the temperature of the substance in the receptacle, wherein the control means controls the temperature means to maintain the temperature of the cover to be at a substantially fixed given temperature above the temperature of the substance in the receptacle.

22. A device as in claim 21 wherein the control means controls the temperature means to maintain the temperature of the cover to be substantially 5° C. above the temperature of the substance in the receptacle.

23. A laboratory device for processing a biological or chemical sample substance comprising:

a receptacle for containing a small volume vaporizable biological or chemical substance for laboratory processing;

substance temperature means for effecting temperature control of the substance in the receptacle, wherein the substance temperature means controls the temperature of the substance in accordance with a specified temperature profile;

a cover configured to cover the receptacle for substantially preventing escape of vapor from the receptacle;

cover temperature means for varying the temperature of the cover; and control means for controlling the cover temperature means to maintain the temperature of the cover to above the temperature of the substance in the receptacle.

24. A device as in claim 23 wherein the control means further actively controls the cover temperature means to maintain the temperature of the cover in accordance with a specified temperature profile.

25. A device as in claim 23 wherein the control means controls the cover temperature means to maintain the temperature of the cover to be slightly above the temperature of the substance in the receptacle.

26. A device as in claim 25 wherein the control means controls the cover temperature means to maintain the temperature of the cover to be at a substantially fixed given temperature above the temperature of the substance in the receptacle.

27. A device as in claim 26 wherein the control means controls the temperature means to maintain the temperature of the cover to be substantially 5° C. above the temperature of the substance in the receptacle.

28. A device as in claim 23 further comprising automatic means for automatically positioning the cover onto the receptacle.

29. A device as in claim 28 wherein the automatic means comprises means for pivoting the cover onto the receptacle.

30. A laboratory device for processing of a biological or chemical sample substance comprising:

a receptacle for containing a small volume of vaporizable biological or chemical substance for laboratory processing;

temperature means for creating a temperature gradient in the receptacle above the substance, said temperature means including means for substantially preventing escape of vapor from the receptacle; and means for actively controlling the temperature means whereby the temperature gradient is maintained in a manner such that the temperature is higher away from the substance.

31. A device as in claim 30 wherein the control means further actively controls the temperature means to maintain the temperature of the temperature means in accordance with a specified temperature profile.

32. A device as in claim 31 wherein the temperature means includes a cover for covering the receptacle.

33. A device as in claim 32 further comprising positioning means for automatic positioning of the cover onto the receptacle.

34. A device as in claim 33 further comprising substance temperature means for effecting temperature control of the substance in the receptacle in accordance with a specified temperature profile.

35. A laboratory device for processing biological or chemical sample substances comprising:

a receptacle having multiple wells for containing vaporizable biological or chemical substances;

a cover configured to cover the wells for substantially preventing escape of vapor from the wells;

temperature means for varying the temperature of the cover; and control means for controlling the temperature means to maintain the temperature of the cover to above the temperature of the substances in the wells, wherein the control means actively controls the temperature means to maintain the temperature of the cover in accordance with a specified temperature profile.

36. A device as in claim 35 further comprising positioning means for automatic positioning of the cover onto the receptacle.

37. A device as in claim 36 further comprising substance temperature means for effecting temperature control of the substances in the receptacle in accordance with a specified temperature profile.

* * * * *